United States Patent
Whaley

(10) Patent No.: US 6,770,328 B1
(45) Date of Patent: Aug. 3, 2004

(54) METHOD OF MAKING A TERRAZZO SURFACE FROM RECYCLED GLASS

(76) Inventor: Tim Whaley, 3941 Legacy Dr., Plano, TX (US) 75023

( * ) Notice: Subject to any disclaimer, the term of this patent is extended or adjusted under 35 U.S.C. 154(b) by 0 days.

(21) Appl. No.: 10/454,678

(22) Filed: Jun. 5, 2003

(51) Int. Cl.$^7$ ............................. B05D 1/36; B05D 7/24; E04B 1/16
(52) U.S. Cl. .................................... 427/407.1; 264/31
(58) Field of Search .............................. 427/355, 407.1; 106/287.72, 482, 489, 506; 264/31; 52/31, 318, 181, 315

(56) References Cited

U.S. PATENT DOCUMENTS

| | | | | |
|---|---|---|---|---|
| 2,198,929 A | * | 4/1940 | Whiteman | 404/112 |
| 3,344,011 A | * | 9/1967 | Goozner | 428/67 |
| 3,552,988 A | * | 1/1971 | Boiardi | 427/204 |
| 3,903,587 A | * | 9/1975 | Boiardi | 29/418 |
| 4,305,863 A | | 12/1981 | Adachi et al. | 523/214 |
| 4,349,401 A | * | 9/1982 | Dahlberg | 156/221 |
| 5,002,827 A | | 3/1991 | Shimada et al. | 428/407 |
| 5,047,187 A | * | 9/1991 | Banus | 264/71 |
| 5,087,518 A | | 2/1992 | Shimada et al. | 428/372 |
| 5,248,338 A | * | 9/1993 | Price | 106/712 |
| 5,375,777 A | | 12/1994 | Peherson | 241/22 |
| 5,681,194 A | | 10/1997 | Baker | 442/394 |
| 5,849,124 A | * | 12/1998 | Rusk et al. | 156/71 |
| 5,879,601 A | | 3/1999 | Baker | 264/112 |
| 6,350,501 B1 | | 2/2002 | Guariento | 428/38 |
| 6,361,826 B2 | | 3/2002 | Olson et al. | 427/189 |
| 6,491,852 B1 | | 12/2002 | Sedaka | 264/35 |
| 6,517,915 B1 | | 2/2003 | Banus | 428/15 |
| 2002/0119302 A1 | | 8/2002 | Fritz | 428/325 |
| 2003/0027919 A1 | | 2/2003 | Fritz | 524/494 |

FOREIGN PATENT DOCUMENTS

| | | | | |
|---|---|---|---|---|
| DE | 197 55 626 A1 | 6/1999 | | |
| WO | WO-99/05075 A1 | * 2/1999 | ........... | C04B/26/18 |

OTHER PUBLICATIONS

Selke, S.E., "Materials Recycling," Chapter 14 from "Handbook of Materials for Product Design, 3rd Edition," © 2001 by McGraw–Hill, Inc., pp. 14.29–14.32.*

* cited by examiner

Primary Examiner—Shrive P. Beck
Assistant Examiner—William Phillip Fletcher, III
(74) Attorney, Agent, or Firm—Richard C. Litman

(57) ABSTRACT

The method of making a terrazzo surface from recycled glass involves several steps. First, the substrate over which the terrazzo layer is formed is conditioned and primed. Second, an epoxy mixture is made by mixing crushed recycled glass, epoxy resin and epoxy primer. Third, the epoxy mixture is poured over the substrate to a height of 3/8" nominally. Fourth, the mixture is troweled and allowed to cure and harden. Fifth, the surface is ground and polished to expose glass fragments near the surface. Grout is then applied to fill any air bubbles opened during the grinding process. Finally, the floor is polished and sealed. Decorative patterns and designs may also be formed in the terrazzo by attaching metal divider strips of different shapes to the substrate before pouring the epoxy mixture, and then using different colored mixtures to create patterns and/or designs in the surface.

3 Claims, 4 Drawing Sheets

METHOD OF MAKING A TERRAZZO SURFACE FROM RECYCLED GLASS

BACKGROUND OF THE INVENTION

1. Field of the Invention

The present invention relates to methods of forming a decorative epoxy surface composed of a binder and hard aggregates. More particularly, the present invention relates to a method of making a terrazzo surface from recycled glass and epoxy resin.

2. Description of the Related Art

Terrazzo flooring and coatings have a long and rich history for construction and decorative purposes, dating back hundreds of years. This method of creating durable, seamless surfaces involves mixing a binder, such as a resin, with one or more aggregates, such as marble or granite. Once the mixture is cured, it forms a surface layer that is durable and easy to maintain. Terrazzo is thus well known in the building industry. However, the methods and materials used to create a terrazzo surface vary widely.

U.S. Pat. No. 3,552,988, issued in 1971 to Boiardi, discloses a method for making terrazzo floor coverings. The method involves mixing an aggregate with a resinous binder, wherein one-third to one-half of the aggregate is first mixed with the fluid binder. The mixture is then spread over a preconditioned floor with a trowel. Immediately thereafter the remainder of the aggregate is sprinkled over the surface and is mechanically forced into the layer. The resin is then cured and the surface is ground smooth. This process exposes the aggregate chips sprinkled on top, thus creating a hard, decorative surface.

U.S. Pat. No. 4,305,863, issued in 1981 to Adachi et al., describes a composition of resin and glass beads. The resin is mixed with glass beads having a diameter of not more than 100 microns, and an aminosilane or epoxysilane. The composition can be made by kneading under heat a thermoplastic polyurethane and glass beads coated with an aminosilane or epoxysilane.

U.S. Pat. Nos. 5,002,827 and 5,087,518, issued in 1991 and 1992 respectively to Shimada et al., describe an agglomerate of molten thermoplastic resin, and a glass composite made from glass flakes and short glass strands. The glass flakes and strands are put into granular form by bonding them together with a binder. The granular glass composites are then incorporated into thermoplastic resins in order to reinforce the resin.

U.S. Pat. No. 5,375,777, issued in 1994 to Pehrson, describes a process for making a building material by mixing waste material, silica material and an epoxy resin. First, the waste material is ground down to produce half-inch particles. Next a resin precursor material and a hardener are mixed to form an epoxy mortar. The ground up waste material is then mixed with the epoxy mortar. Thereafter, sand is mixed with the epoxy mortar/waste mixture. Finally, air is removed from the mixture, causing it to dry and harden. The mixture described in the Pehrson patent is a cement-like material for use in building materials. It may be formed into a desired shape and size by way of a press, mold or die and may be combined with another material, such as insulation.

U.S. Pat. No. 5,681,194, issued in 1997 to Baker, describes a hardenable binder material containing pieces of recycled fiber reinforced resin and a quantity of granular aggregate material. The binder material is initially in a liquid state, but hardens over time without the need for heat. The binder material may derive from materials having an initially plastic state and which are mixable with fiber reinforced resin pieces and granular aggregate. The fiber reinforced resin materials are derived from waste or surplus and consist of glass fibers embedded in resin. U.S. Pat. No. 5,879,601 issued in 1999 to Baker describes a method and apparatus for making the aforementioned product U.S. Pat. No. 6,350,501, issued in 2002 to Guariento, describes an agglomerate used for construction or decoration, which comprises a mixture of granular inert materials, such as marble, granite or similar material, binding resin and granular glass. The agglomerate forms a solid surface and contains a quantity and quality of granular glass that allows light to pass through the solid.

U.S. Pat. No. 6,361,826, issued in 2002 to Olson et al., describes a polymer surface coating made by combining a polymer with a coalescing agent. The combination of these materials forms a continuous coating layer having appropriate drying hardness and durability.

U.S. Patent Publication Nos. 2002/0119302 and 2003/0027919, published in 2002 and 2003, respectively, describe a surface coating composition and method comprising randomly shaped glass chips dispersed in a resinous carrier. Glass beads may optionally be added to the composition, adding additional luster to the coating. A flaky pigment made from a cholesteric liquid crystal polymer may also be added to impart a dichroism to the film coating. The presence of this liquid polymer produces shifting colors based on the angle of view. The composition described in these publications is a film coating that is applied to items such as automobiles, bicycles, and vessels in order to produce a sparkling sheen, heat barrier and dichroism.

U.S. Pat. No. 6,491,852, issued in 2002 to Sedaka, describes a method of making terrazzo floors with inlays. An insert is created by pouring an epoxy mixture containing visual elements (e.g. pigments, colored plastic or glass chips) into a mold. The insert is then affixed to the sub-floor and a separate epoxy mixture is poured over the floor and inserts. This epoxy mixture may contain visual ingredients, one of which is different from the mixture used to fill the inserts. After the floor has cured and hardened it is ground and polished to expose the inserts, which are integrated into the terrazzo floor. The method described in the Sedaka patent involves the steps of making inserts and integrating the inserts into a terrazzo floor.

U.S. Pat. No. 6,517,915, issued in 2003 to Banus, discloses a composite stone surfacing material. The material comprises a binder mixed with a hard aggregate in the form of granulated quartz. The granules of quartz are coated with a metallic, plastic or ceramic film, which provides reflective properties, adding visual effect to the stone surface after the mixture is cast and cured.

German Pat. No. 19,755,626, published in 1999, describes a floor or wall covering comprising a base layer and a covering layer. The base layer is made from epoxy resin and/or polyurethane and pearlescent pigments, while the covering layer is a mix of plastics and solid, colored particles such as glass. After the covering has set, the surface layer is ground and polished.

None of the above inventions and patents, taken either singly or in combination, is seen to describe the instant invention as claimed. Thus a method of making a terrazzo surface from recycled glass solving the aforementioned problems is desired.

SUMMARY OF THE INVENTION

The present invention is a method or process of making terrazzo flooring, countertop or decorative coatings from a mixture of recycled glass and epoxy resin. The coating will consist of a matrix of resinous material containing a hard aggregate in the form of recycled glass, which is distributed throughout the matrix. Upon completion, the coating forms a seamless, attractive and wear-resistant surface, which has the added benefit of being environmentally friendly.

The method includes mixing epoxy resin with an epoxy filler, which forms an epoxy mortar. Crushed recycled glass aggregate is added and mixed, so that it is well distributed throughout the resin. This mixture of material is poured over a hard surface and troweled to a nominal thickness of ⅜". A mechanical trowel is subsequently used to improve production and compaction of the recycled glass aggregate. Once the mixture has cured, the epoxy surface is ground and polished, creating a smooth, visually attractive terrazzo surface.

Accordingly, it is a principal object of the invention to create terrazzo surfaces made from a resinous binder and an aggregate consisting of crushed recycled glass, thereby creating an environmentally friendly, wear-resistant and attractive surface.

It is another object of the invention to provide a method of making a resinous terrazzo surface which is inexpensive to manufacture due to the use of 100% post-consumer recycled glass.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
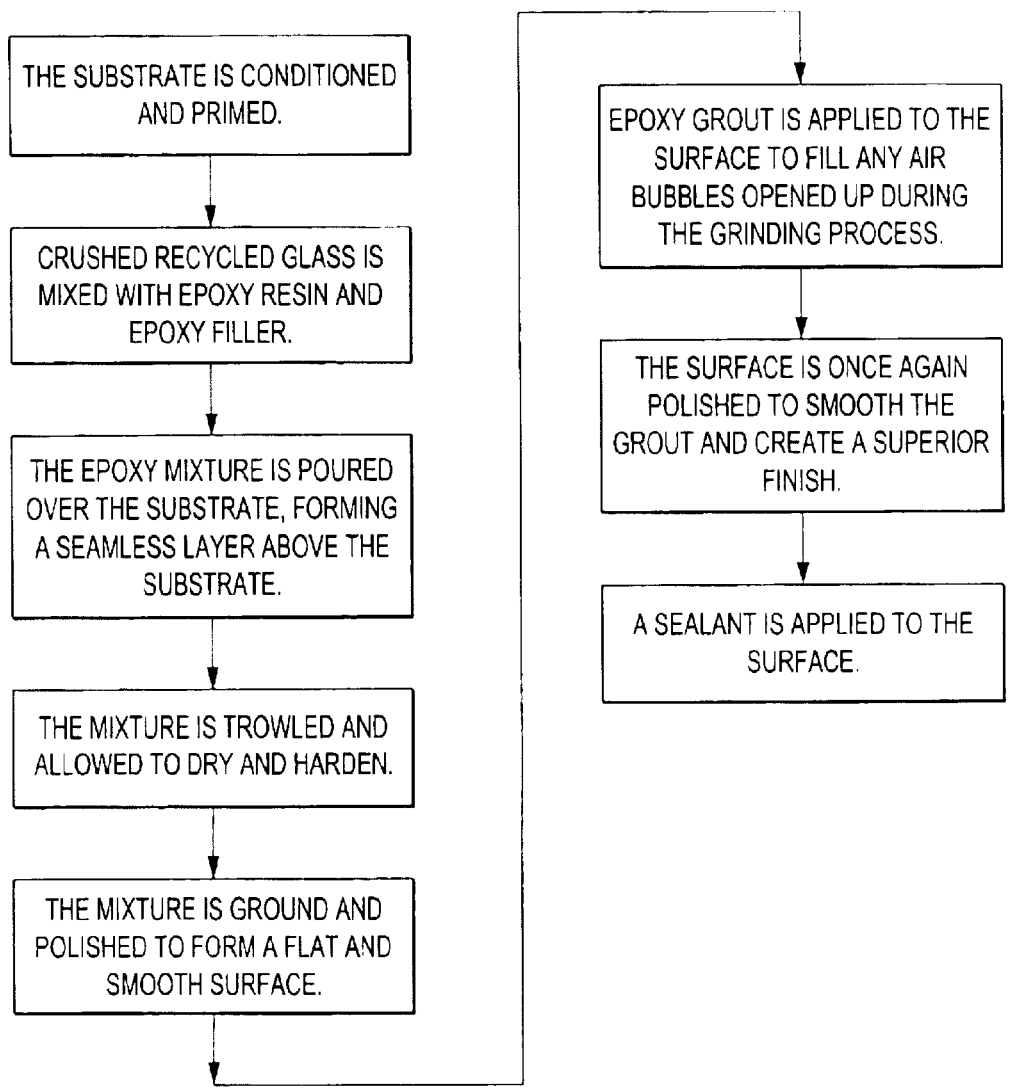
FIG. 1 is a block diagram depicting the method of making the terrazzo surface from epoxy resin and post-consumer recycled glass.

The present invention is a method of making monolithic terrazzo surfaces (e.g. flooring, countertops or other decorative applications) from epoxy resin and 100% post-consumer recycled glass. The method described herein, depicted in FIG. 1, is more economical and environmentally friendly than other terrazzo methods because it utilizes recycled glass as an aggregate.

Figure 2:
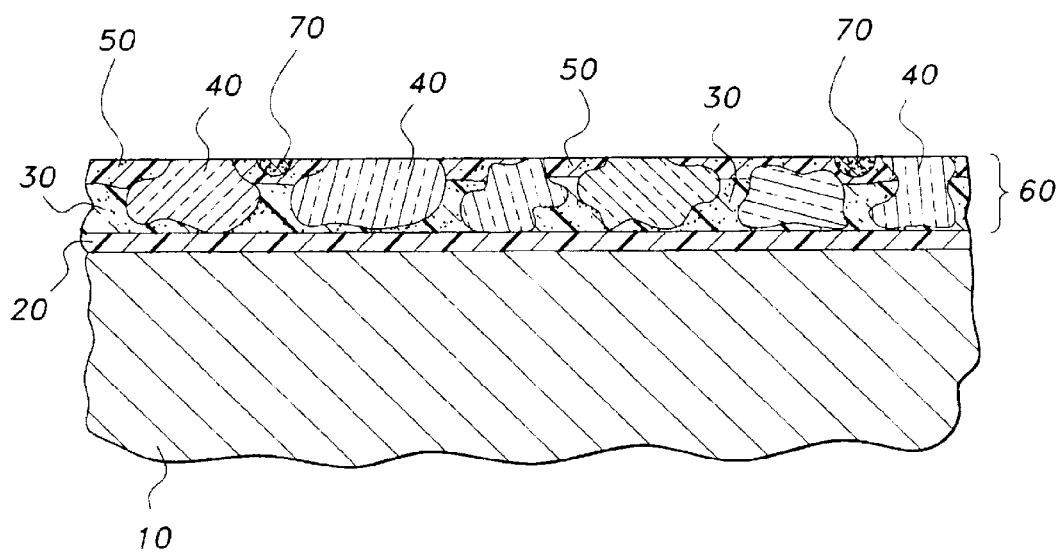
FIG. 2 is a fragmented, elevational view, in section, showing the resinous matrix with suspended recycled glass fragments.
Figure 3:
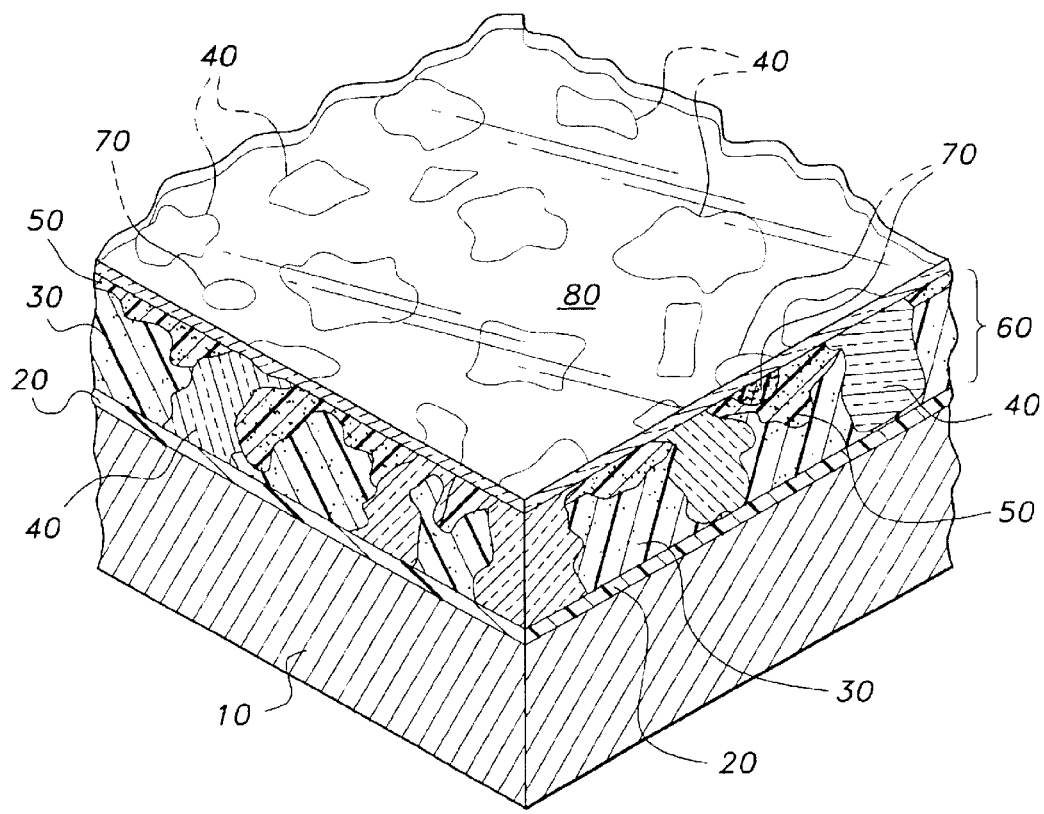
FIG. 3 is a fragmented, perspective view, in section, of the finished surface after grinding and polishing.

The method includes the following steps. First, the floor or substrate 10, as shown in FIGS. 2 and 3, is conditioned by cleaning it and then applying to the clean floor a coating of primer material 20, which is a bonding agent and serves to provide improved adhesion for subsequently applied resin. The substrate 10 is preferably concrete, but may be another type of surface. Priming the concrete helps to seal in air and prevent outgassing and air bubbling in the finished system.

Conditions on and around the substrate should be as follows. (1) Surface and air temperatures must be at least 55 degrees Fahrenheit during the installation and initial cure of the terrazzo layer. (2) Moisture vapor transmission should not exceed 3 pounds per 1000 square feet per 24-Hour period. (3) Concrete substrate should have laitance removed, preferably using a vacuum shot blasting method. (4) Concrete substrate needs to have cured a minimum of 28 days. (5) Concrete substrate is level to within ¼" in 10 feet. (6) All depressions, cracks and spalled areas should be corrected prior to topping.

Second, the epoxy primer 20 is poured onto the prepared concrete 10 and spread with either a flat trowel or squeegee to a coverage of 250 square feet per gallon. The primer is then rolled using a back roll with a short nap roller to remove any puddles.

Third, the primer 20 is allowed to sit for 30 minutes. The epoxy mixture may be applied over wet primer for up to five hours. If the primer sits for a longer period, a light broadcast of dry silicate sand is recommended before applying the mixture.

Fourth, after the primer coating 20 has been applied and allowed to sit for the recommended period, a mixture of epoxy resin 30, recycled glass aggregate 40, and epoxy filler 50 are mixed in a batch and applied as a layer 60 over the coating 20. Mixing batches of terrazzo should be done in a 3–5 cubic foot revolving blade type mortar mixer.

Fifth, a batch of terrazzo is mixed according to the following steps. (1) Epoxy resin 30, comprising a resin and a hardener, is mixed for three minutes at a low speed. One gallon of epoxy resin is recommended per 8–10 square feet of coverage. (2) Epoxy filler 50 is slowly added into the mixed resin as needed. (3) Recycled glass aggregate 40 is added to the mortar mix in the recommended amount of 4 pounds per square foot of coverage. A properly mixed batch should have a glistening wet appearance. A small amount of catalyzed resin is optionally added to the first batch if it is slightly dry due to absorption of the epoxy into the mixing vessels.

Sixth, the epoxy mixture is then poured onto the primed surface where it is spread in a line or in small areas. A flat trowel is used to spread the mixture to a thickness of ⅜" nominally. The thickness of the terrazzo surface may vary, but testing has provided sufficient results at ⅜".

Seventh, manual troweling is followed by mechanical troweling to improve production and compaction of the epoxy mixture where applicable.

Eighth, additional glass aggregate 40 may be sprinkled on the surface to create better uniformity of aggregate distribution throughout the resinous mixture.

Ninth, the mixture is then allowed to cure for 24 hours before grinding can take place. The curing process occurs chemically in the air, but may be accelerated through use of heaters.

Tenth, once the mixture has cured, it is initially ground smooth using a 24 grit stone, which is sufficient to expose the aggregate 40 and smooth the surface.

Eleventh, a second grind utilizing an 80 grit stone over the same area is used to eliminate swirl or irregular patterns. The grinding machine must be kept moving at all times, first in parallel lines then diagonally across the floor.

Twelfth, after the floor is ground smooth, it must be dried and cleaned of all grinding fines.

Thirteenth, an epoxy grout 70 is then applied to fill air bubbles that are opened during the grinding process. Grout

70 is applied tightly to the surface using a straight edge trowel and is allowed to cure for 24 hours before final polishing. Spreading epoxy filler over the surface helps to absorb excess grout.

Fourteenth, a final polishing of the surface is performed with a 120 or finer grit stone. Finer polishing produces a superior finish.

Fifteenth, the terrazzo surface is then sealed using an acrylic sealer 80. Two to three coats of sealer 80 are applied to the surface using a short nap roller at a coverage rate of 300–500 square feet per gallon. The sealer 80 is then allowed to cure for 24 hours.

Figure 4:
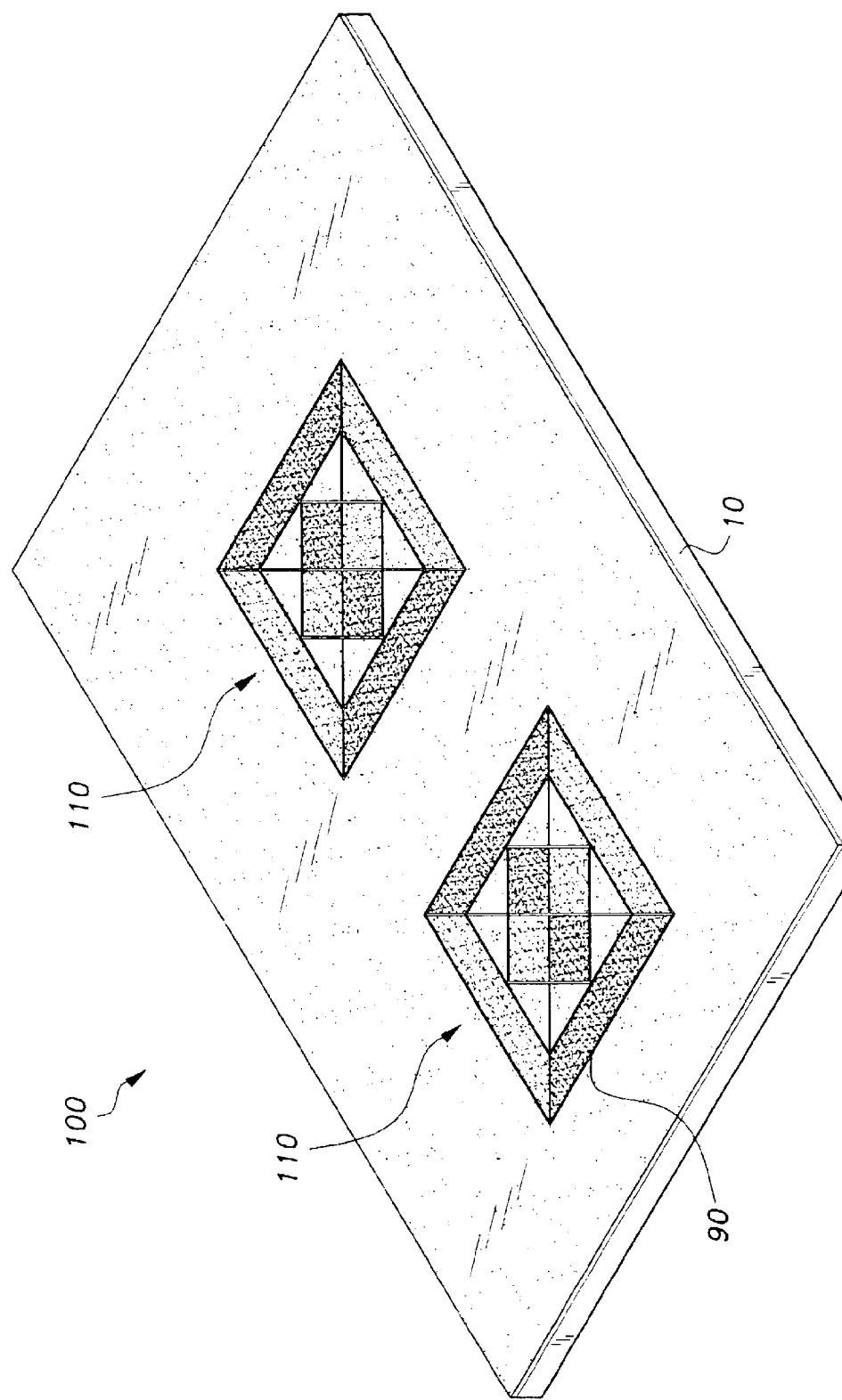
FIG. 4 is an environmental, perspective view of a finished surface with a design inlay.

In an alternative embodiment 100 shown in FIG. 4, decorative color patterns and/or designs 110 are formed in the terrazzo surface. This is accomplished by using 3/8" high metal divider strips 90, which are pre-assembled in a particular shape and attached to the substrate 10 prior to applying the epoxy mixture. Metal strips of this height are used so that the top of the metal strips are level with the surface of the terrazzo coating. However, metal strips of varying heights may be used with terrazzo of varying thickness. The particular shape and design of the metal strips form no part of the invention, and any shape and design may be employed without departing from the invention. Such patterns or designs are created by pouring different colored epoxy mixtures into the space(s) formed by the metal divider strips. Mixtures containing different visual elements may similarly be used to create visual contrast for decorative designs. Decorative patterns or effects are also created when epoxies of different colors are allowed to flow together to create gradual color shifts.

Furthermore, the present invention is not limited to flooring. Rather, the terrazzo coating may be applied to countertops, or may be used to create decorative furniture. Countertops are created using the same method described above, except that the epoxy mixture is poured into an appropriately sized and shaped mold to fit over the counter. Casting the terrazzo in a mold is also used to create pre-fabricated furniture or other objects.

It is to be understood that the present invention is not limited to the embodiments described above, but encompasses any and all embodiments within the scope of the following claims.

I claim:

1. A method of making a monolithic terrazzo surface, consisting of the steps of:

conditioning and coating a substrate with primer material;

mixing a batch of crushed recycled glass, an epoxy filler and hardenable resinous fluid binder to form a heterogeneous mixture;

applying a substantially uniform layer of the mixture over the primed substrate to a nominal thickness of about 3/8";

manually and mechanically troweling the mixture;

sprinkling additional recycled glass onto the surface of the resinous mixture;

allowing the fluid binder to harden to form a surface of hardened mixture;

grinding and smoothing the surface of the hardened mixture;

grouting the surface;

cleaning and polishing the surface; and applying a sealant to said surface.

2. A method of making a monolithic terrazzo surface, consisting of the steps of:

conditioning and coating a substrate with primer material;

affixing metal divider strips having pre-assembled designs and shapes to the substrate;

mixing different color batches of crushed recycled glass, an epoxy filler and hardenable resinous fluid binder to form a heterogeneous mixture;

applying a substantially uniform layer of each color mixture over the primed substrate and between the strips to a nominal thickness of about 3/8", in order to form visually contrasting areas;

manually and mechanically troweling the mixture in succession;

sprinkling additional recycled glass onto the surface of the resinous mixture;

allowing the fluid binder to harden to form a surface of hardened mixture;

grinding and smoothing the surface of the hardened mixture;

grouting the surface;

cleaning and polishing the surface; and applying a sealant to said surface.

3. A method of making a monolithic terrazzo surface, consisting of the steps o:

conditioning and coating a substrate with primer material;

mixing different color batches of crushed recycled glass, an epoxy filler and hardenable resinous fluid binder to form a heterogeneous mixture;

applying the different colored epoxy-glass mixture batches and allowing the mixtures to flow together, forming a uniform layer having a nominal thickness of about 3/8", thereby creating a gradual color shift over the primed substrate;

manually and mechanically troweling the layer;

sprinkling additional recycled glass onto the surface of the layer;

allowing the fluid binder to harden to form a surface of hardened layer;

grinding and smoothing the surface of the hardened layer;

grouting the surface;

cleaning and polishing the surface; and applying a sealant to said surface.

* * * * *